United States Patent
Golway (10) Patent No.: US 11,249,459 B2
(45) Date of Patent: *Feb. 15, 2022

(54) SYSTEM AND WORKSTATION FOR THE DESIGN, FABRICATION AND ASSEMBLY OF 3-DIMENSIONAL CONSTRUCTS

(71) Applicant: Advanced Solutions Life Sciences, LLC, Louisville, KY (US)

(72) Inventor: Michael W. Golway, Louisville, KY (US)

(73) Assignee: Advanced Solutions Life Sciences, LLC, Louisville, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/068,028

(22) Filed: Oct. 12, 2020

(65) Prior Publication Data

US 2021/0041854 A1 Feb. 11, 2021

Related U.S. Application Data

(63) Continuation of application No. 16/264,833, filed on Feb. 1, 2019, now Pat. No. 10,838,404.

(Continued)

(51) Int. Cl.
*G05B 19/4099* (2006.01)
*G06F 30/20* (2020.01)

(52) U.S. Cl.
CPC ......... *G05B 19/4099* (2013.01); *G06F 30/20* (2020.01); *G05B 2219/49023* (2013.01)

(58) Field of Classification Search
CPC ............... B33Y 50/00; G05B 19/4099; G05B 2219/31031; G05B 2219/49023; G06F 30/17; G06F 30/20

See application file for complete search history.

(56) References Cited

U.S. PATENT DOCUMENTS 9,026,409 B2 5/2015 Schmidtke et al.
2005/0071135 A1 3/2005 Vredenburgh et al.
(Continued)

OTHER PUBLICATIONS

Communication Pursuant to Rule 161(2) and 162 EPC filed in European Application No. 19747134.5-1222 dated Sep. 15, 2020.
(Continued)

*Primary Examiner* — Chad G Erdman
(74) *Attorney, Agent, or Firm* — Dinsmore & Shohl, LLP (57) ABSTRACT

Methods and systems for designing a volumetric model of a construct at a user interface through use of a 3-D design, fabrication and assembly system comprising a modeling component, a robotic assembly workstation component, and a workflow configuration module to generate, through the workflow configuration module, a 3-D print bill of materials for a rendered volumetric model; generate a workflow configuration model based on the 3-D print bill of materials, the model including an automated robot control scheme of a series of assembly order instructions to direct a multi-axis robot of the robotic assembly workstation component to print and/or assemble a construct; transmit the workflow configuration model to the robotic assembly workstation component with a print and/or assembly command in accordance with the automated robot control scheme; and print and/or assemble the construct with the multi-axis robot in accordance with the print and/or assembly command.

20 Claims, 8 Drawing Sheets

Related U.S. Application Data (60) Provisional application No. 62/626,329, filed on Feb. 5, 2018.

(56) References Cited

U.S. PATENT DOCUMENTS

| | | |
|---|---|---|
| 2015/0005919 A1 | 1/2015 | McGatha et al. |
| 2015/0105891 A1 | 4/2015 | Golway et al. |
| 2017/0266810 A1 | 9/2017 | Linnell et al. |
| 2017/0290345 A1 | 10/2017 | Garden et al. |
| 2018/0200965 A1* | 7/2018 | Meess .................... B25J 9/1682 |
| 2019/0005185 A1* | 1/2019 | D'Antuono ............... B64F 5/00 |
| 2019/0212950 A1 | 7/2019 | Schloesser et al. |

OTHER PUBLICATIONS

International Search Report dated Apr. 15, 2019, pertaining to PCT/US19/16238, filed Feb. 1, 2019, 26 pages.

* cited by examiner

SYSTEM AND WORKSTATION FOR THE DESIGN, FABRICATION AND ASSEMBLY OF 3-DIMENSIONAL CONSTRUCTS

CROSS-REFERENCE TO RELATED APPLICATIONS

This application is a continuation of U.S. Non-Provisional application Ser. No. 16/264,833, filed Feb. 1, 2019, which claims the benefit of U.S. Provisional Application Ser. No. 62/626,329, filed Feb. 5, 2018, the entirety of which is incorporated by reference herein.

BACKGROUND

Techniques to employ 3D printing and/or assembly tasks in an industrial environment may utilize a robot application for a finite number of highly repetitive tasks and require robotic software programming by expert programmers to program the robot application for such tasks. Accordingly, a need exists for alternative robot application usages for 3D printing and/or assembly tasks that are more time and cost effective and less labor intensive for a user.

BRIEF SUMMARY

According to the subject matter of the present disclosure, a method is described for designing a volumetric model of a construct at a user interface through use of a 3-D design, fabrication and assembly system. The 3-D design, fabrication and assembly system may include a modeling component, a robotic assembly workstation component, a workflow configuration module, and a hardware processor coupled to a memory. The modeling component may include the user interface, at least one suite of tools for performing an object operation selected from creating, editing, modeling, transforming, image property modulating, sketching, print supporting, simulating, material testing and combinations thereof, a material database, and software stored in the memory and executable by the hardware processor to facilitate the method for designing the volumetric model of the construct at the user interface. The modeling component may be operationally linked to the robotic assembly workstation component. The method may further include transmitting a rendered volumetric model of the construct to the workflow configuration module, generating, through the workflow configuration module, a 3-D print bill of materials for the rendered volumetric model, and generating a workflow configuration model for the rendered volumetric model based on the 3-D print bill of materials. The workflow configuration model may include an automated robot control scheme comprising a series of assembly order instructions to direct a multi-axis robot of the robotic assembly workstation component to print and/or assemble the construct in accordance with the automated robot control scheme. The method may further include transmitting the workflow configuration model comprising the automated robot control scheme to the robotic assembly workstation component with a print and/or assembly command in accordance with the automated robot control scheme, and printing and/or assembling the construct with the multi-axis robot in accordance with the print and/or assembly command.

In accordance with another embodiment of the present disclosure, a 3-D design, fabrication and assembly system may include a modeling component, a robotic assembly workstation component, a workflow configuration module, a hardware processor coupled to a memory storing one or more instructions. The modeling component may include a user interface, at least one suite of tools for performing an object operation selected from creating, editing, modeling, transforming, image property modulating, sketching, print supporting, simulating, material testing and combinations thereof, a material database, and software comprising the one or more instructions stored in the memory and executable by the hardware processor to facilitate a method for designing a volumetric model of a construct at the user interface, the modeling component being operationally linked to the robotic assembly workstation component. The one or more instructions, when executed by the hardware processor, may cause the hardware processor to transmit a rendered volumetric model of the construct to the workflow configuration module, generate, through the workflow configuration module, a 3-D print bill of materials for the rendered volumetric model, and generate a workflow configuration model for the rendered volumetric model based on the 3-D print bill of materials. The workflow configuration model may include an automated robot control scheme comprising a series of assembly order instructions to direct a multi-axis robot of the robotic assembly workstation component to print and/or assemble the construct in accordance with the automated robot control scheme. The one or more instructions, when executed by the hardware processor, may further cause the hardware processor to transmit the workflow configuration model comprising the automated robot control scheme to the robotic assembly workstation component with a print and/or assembly command in accordance with the automated robot control scheme, and print and/or assemble the construct with the multi-axis robot in accordance with the print and/or assembly command.

In accordance with yet another embodiment of the present disclosure, a method is described for designing a volumetric model of a construct at a user interface through use of a 3-D design, fabrication and assembly system comprising a modeling component, a robotic assembly workstation component comprising a six-axis robot, a workflow configuration module, and a hardware processor coupled to a memory, the modeling component comprising the user interface, at least one suite of tools for performing an object operation selected from creating, editing, modeling, transforming, image property modulating, sketching, print supporting, simulating, material testing and combinations thereof, a material database, and software stored in the memory and executable by the hardware processor to facilitate the method for designing the volumetric model of the construct at the user interface, the modeling component being operationally linked to the robotic assembly workstation component. The method may include receiving one or more assembly orders in a production queue. The one or more assembly orders may respectively include a plurality of assembly order instructions for a plurality of respective workflow configuration models generated by the workflow configuration module for a series of robotic assembly workstation components. The method may further include automatically generating an assembly order sequence for the one or more assembly orders in the production queue based on a ranking of one or more production factors, one or more artificial intelligence factors, one or more throughout optimization factors, or combinations thereof, displaying the assembly order sequence on the user interface, and printing and/or assembling one or more constructs with one or more respective six-axis robots of the respective robotic assembly workstation components in accordance with the assembly order sequence.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
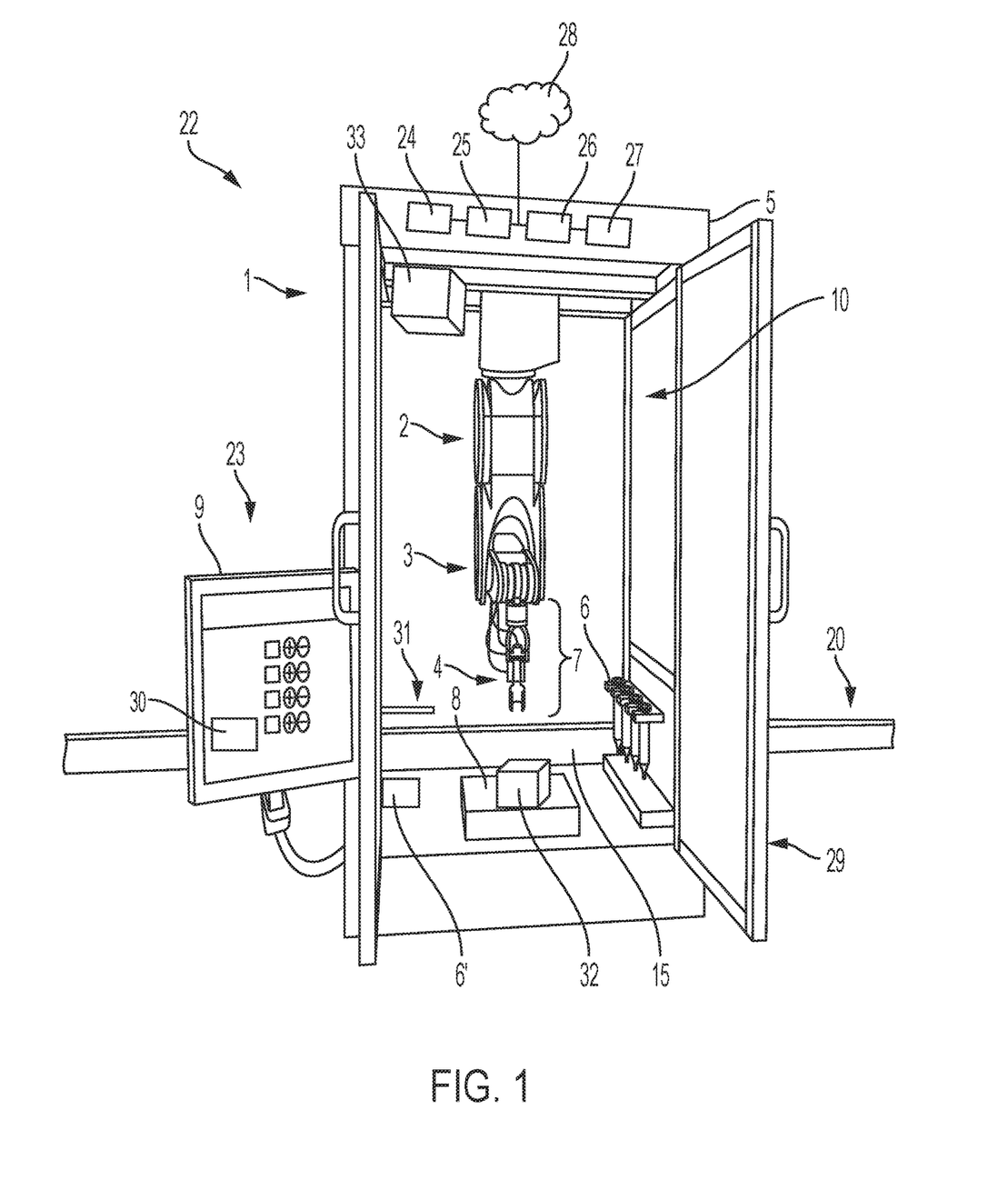
FIG. 1 illustrates a front perspective view of a 3-D design, fabrication and assembly system including a transport conveyor and a robotic assembly workstation component including a multi-axis robot, according to one or more embodiments shown and described herein.

Referring initially to FIG. 1, a 3-D design, fabrication and assembly system 22 may include a modeling component 23, a robotic assembly workstation component 1, a workflow configuration module 24, and a control cabinet 5. The control cabinet 5 may be an electrical and controls cabinet including an enclosed housing for the electrical, mechanical, and controls components required to operate the robotic assembly workstation component 1. The control cabinet 5 may be disposed within the robotic assembly workstation component 1 or encased in a separate enclosure with a universal connector cable for connection to and communicative coupling with the robotic assembly workstation component 1. The control cabinet 5 may include the workflow configuration module 24, a hardware processor 25, a memory 26, and a material database 27 communicatively coupled to one another and a network 28, as described in greater detail further below. Software including one or more instructions, further described in greater detail further below, may be stored in the memory 26, which is coupled to the hardware processor 25.

The modeling component 23 may include a user interface 9, at least one suite of tools for performing an object operation selected from creating, editing, modeling, transforming, image property modulating, sketching, print supporting, simulating, material testing and combinations thereof, a material database 27, and software comprising the one or more instructions stored in the memory 26 and executable by the hardware processor 25 to facilitate a method for designing a volumetric model 30 of a construct 32 at the user interface 9. The modeling component 23 may be operationally linked to the robotic assembly workstation component 1. The robotic assembly workstation component 1, modeling component 23, workflow configuration module 24, a hardware processor 25, and a memory 26, and material database 27 may be communicatively coupled to a network 28.

Figure 5:
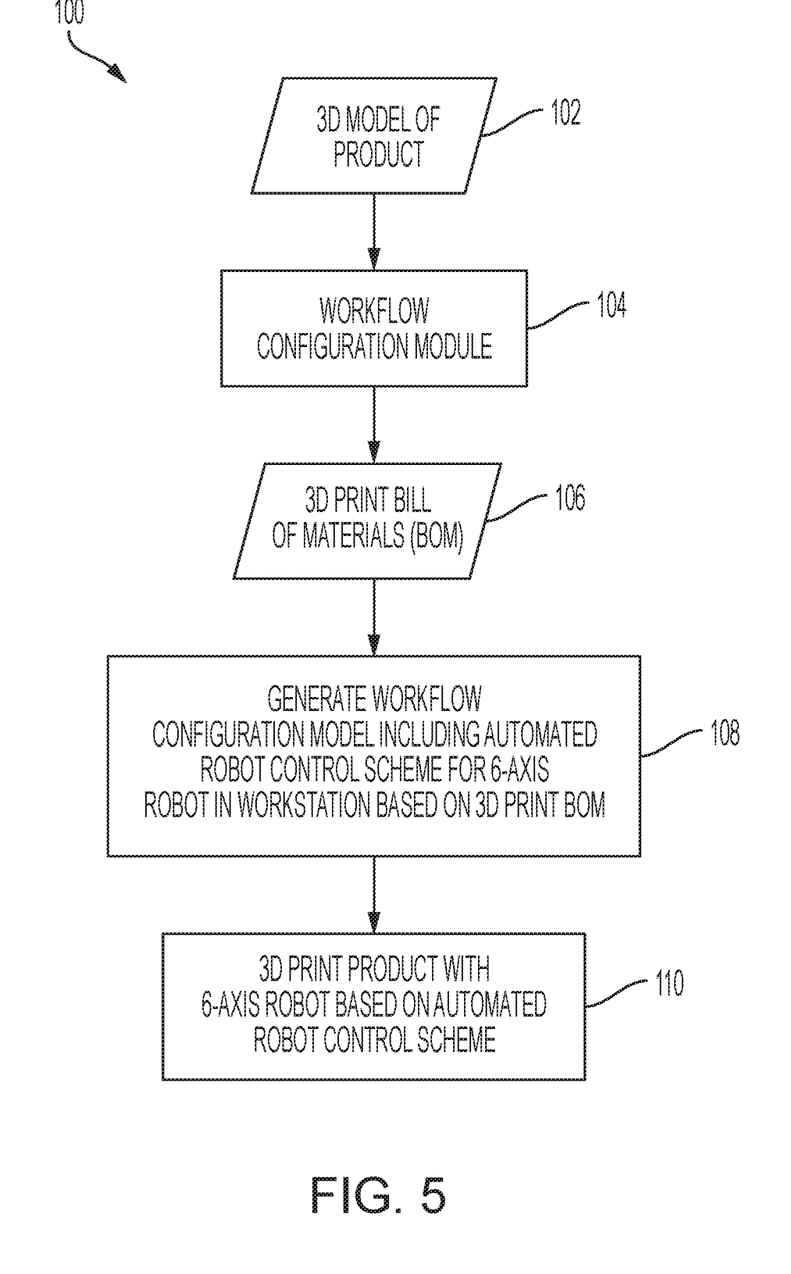
FIG. 5 illustrates a flow chart of a process for generating a workflow configuration model and using and operating the 3-D design, fabrication and assembly system of FIG. 1 or FIG. 4A, according to one or more embodiments shown and described herein.

With reference to FIG. 1 and a process 100 of FIG. 5, the one or more instructions, when executed by the hardware processor, may cause the hardware processor to provide an input of a volumetric model 30 in block 102. In an embodiment, the volumetric model 30 may be a 3-D model of a product comprising the construct 32. Non-limiting examples of such 3-D models including 3D solid models as generated by 3D computer aided design (CAD), solid modeling programs, such as AUTODESK FUSION 360 and AUTODESK INVENTOR as commercially available by Autodesk Inc. In block 104, a rendered volumetric model 30 of the construct 32 is transmitted as an input to the workflow configuration module 24.

Figure 2:
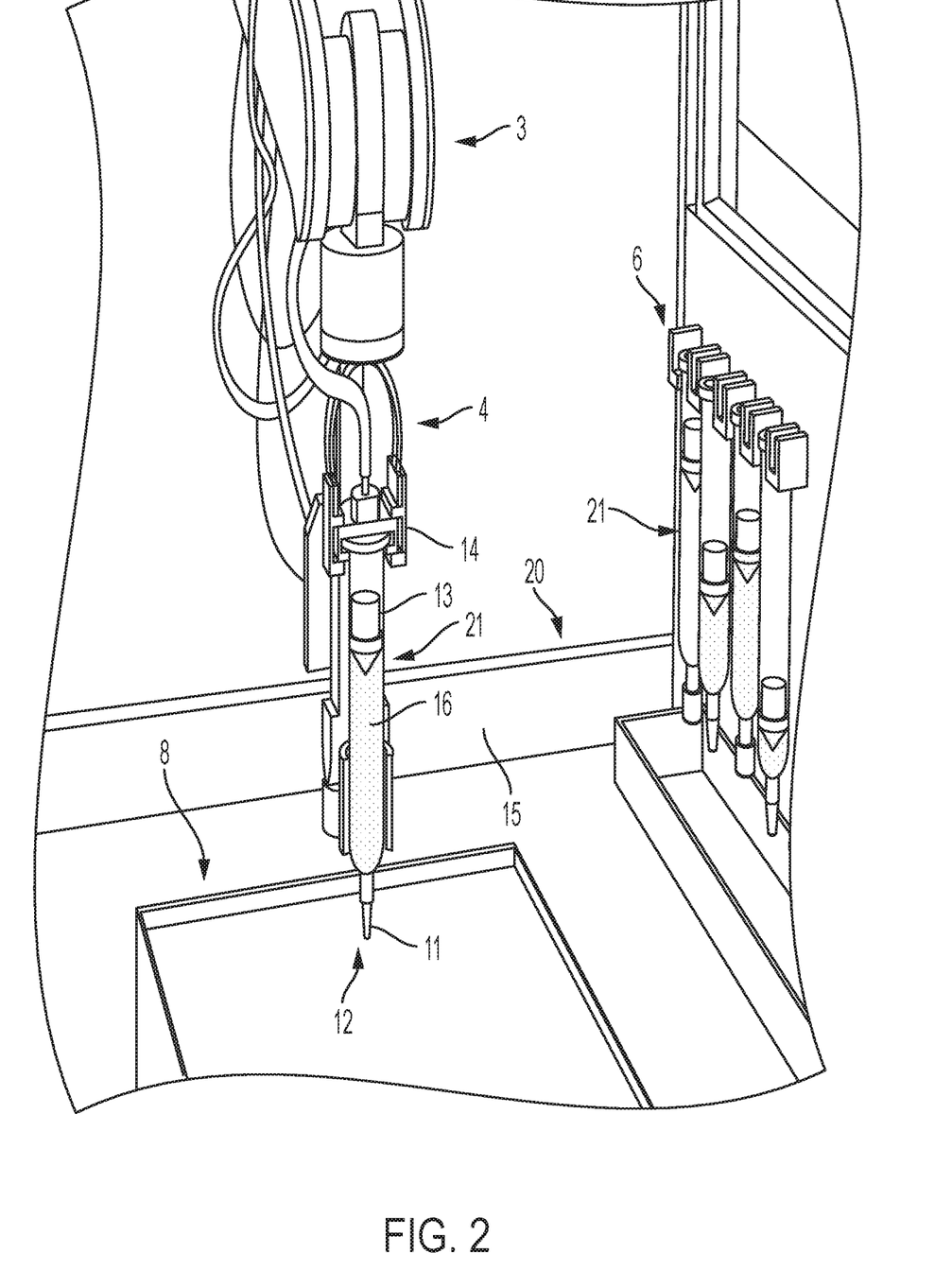
FIG. 2 illustrates a front isometric view of the multi-axis robot of FIG. 1 gripping a printing tool dispensing system in a first position.
Figure 3:
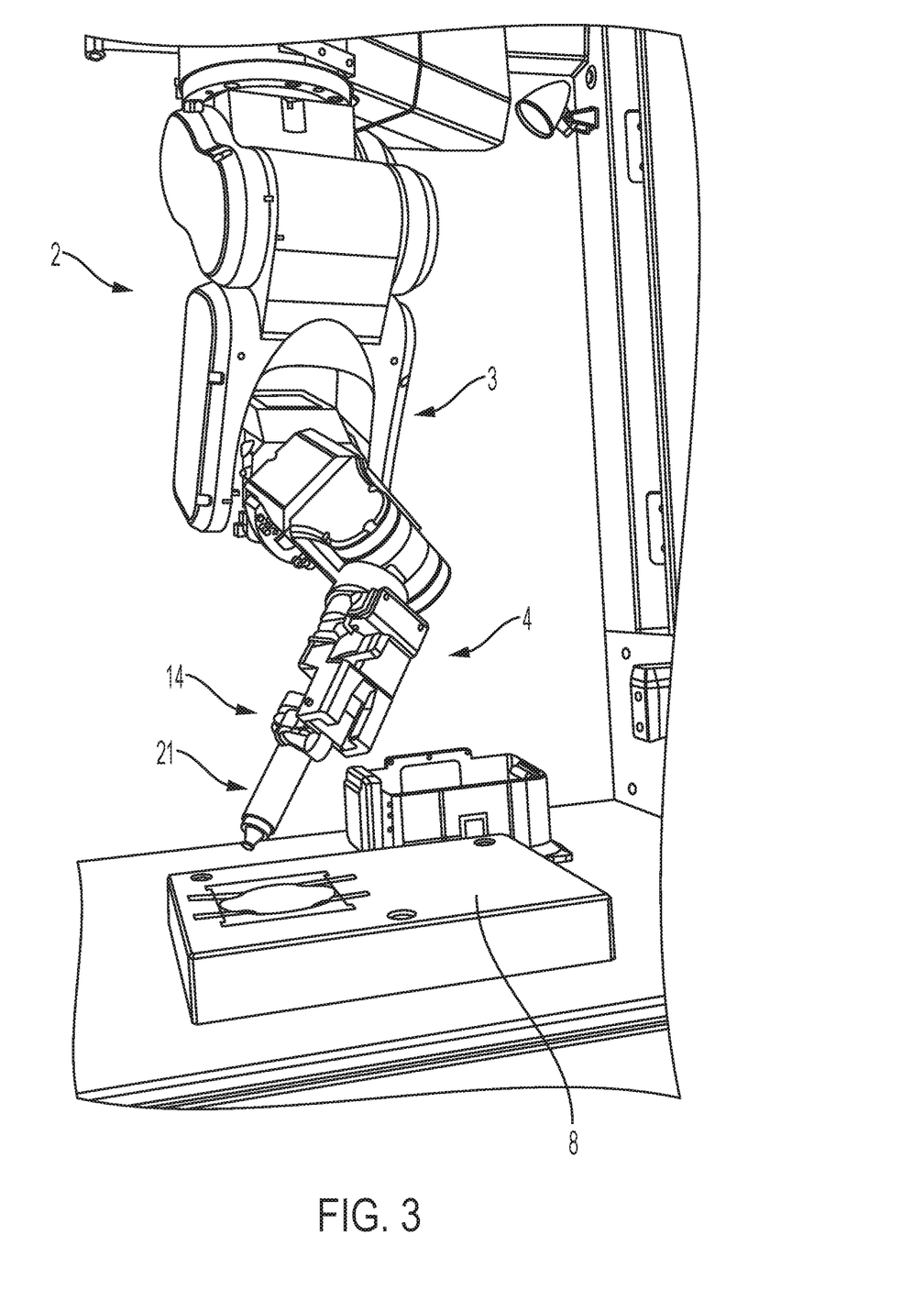
FIG. 3 illustrates a side isometric view of the multi-axis robot of FIG. 1 gripping the printing tool dispensing system in a second position different from the first position of FIG. 2.

In block 106, a 3-D print bill of materials for the rendered volumetric model 30 is generated as an output through the workflow configuration module 24. The rendered volumetric model 30 used as input is translated through the workflow configuration module 24 into a bill of materials exploded view, and a customized workflow is created from individual components in the bill of materials that may either be 3D printed and/or assembled into sub-assemblies or into a final assembly. The customized workflow may include a step by step designation of motion paths of a robot arm 3, as shown in FIGS. 1-3 and described in greater detail below, tool usage, material movement, and the like to create an assembly order associated with the customized workflow.

In block 108, the workflow configuration module 24 is further configured to generate a workflow configuration model for the rendered volumetric model 30 based on the 3-D print bill of materials. The workflow configuration model may include an automated robot control scheme comprising a series of assembly order instructions associated with the customized workflow to direct a multi-axis robot 2 of the robotic assembly workstation component 1 to print and/or assemble the construct 30 in accordance with the automated robot control scheme. The workflow configuration model including the automated robot control scheme may be transmitted to the robotic assembly workstation component 1 with a print and/or assembly command in accordance with the automated robot control scheme. The series of assembly order instructions may be configured to direct the robot arm 3 of the multi-axis robot 2 to sequentially follow an assembly order. The assembly order may include one or more robot arm motion path instructions for the robot arm 3 and components of the robot 2 to follow to print and/or assemble the construct 32, one or more tool usage instructions such as which tools and/or material to use to print and/or assemble the construct 32, and one or more material movement instructions such as how to apply materials and in what amounts to print and/or assembly construct 32, or combinations thereof.

In an embodiment, the automated robot control scheme may launch an assembly order for a construct 32 based on the series of assembly order instructions such that one or more tools and raw material supply and locations to print and/or assemble the construct 32 are verified to ensure a workflow sequence of the automated robot control scheme matches and calibrates with a physical location within the robotic assembly workstation component 1. The workflow sequence is further configured to provide the plurality of motion paths for the robot arm 3 associated with the assembly order based on a configuration of an associated production run either automatically or by a user. The workflow configuration module 24 translates the one or more motion paths into actual movements of the robot arm 3 to pick and place material or select a tool from one or more printing tool storage units 6, 6', which are described in greater detail below. If a motion sequence involves selecting and using a tool, the robot arm 3 connects with a respective tool and moves to the tip detection station 31 at which the system 22 determines relative coordinates of a bottom of the respective tool for tip verification. After tip verification, the robot arm 3 is configured to move to the adjustable print stage 8 to start 3D printing geometry from the rendered volumetric model 30 and/or assembling components. Combinations of instructions to 3D print, move material in and out of assembly queue station(s) 15, and assemble on the adjustable print stage 8 may be implemented based on specifications as defined within the workflow configuration module 24, such as user specifications. Once the assembly order is completed, the robot arm 3 may transfer the object (e.g., the construct 32) or a carrier tray holding the object to the transport conveyor 20 at a rear of the robotic assembly workstation component 1. One or more such assembly orders may include batch run quantities, and the workflow configuration module 24 may loop through a cycle until the quantities have been fulfilled.

The workflow configuration module 24 may operate in a single configuration, such as shown in system 22, or in a workstation series configuration, such as shown in system 22'. The workflow configuration module 24 may access an available number of robotic assembly workstation components 1 and provide this information to a user such that 3D printing and/or assembly tasks may be distributed across the available robotic assembly workstation components 1. An assembly order, as described above, may include such information and be translated in a production run to achieve a desired workflow as developed by a user, for example. Referring to the system 22' including four robotic assembly workstation components 1, a user and/or the workflow configuration module 24 may opt to 3D print, quality measure, assemble, and the like across available robotic workstation components 1. The workflow configuration module 24 may minimize one or more assembly constraints to maximize throughput across the available robotic workstation component(s) 1 of systems 22, 22'. The workflow configuration module 24 is configured to provide cycle time information and insight including decision making loops and parallel processing path may be integrated with other manufacturing machines such that an integrated assembly sequence of operations may be implemented.

In embodiments, and referring to FIGS. 1-3, the robotic assembly workstation component 1 includes a frame housing. The frame housing is an enclosure including the multi-axis robot 2 and a pair of doors 29 that may be positioned in an open position or a closed position. The multi-axis robot 2 may include a six-axis robot such that a multi-axis robot arm 3 is a six-axis robot arm 3 configured for movement multiple degrees of freedom, as shown in FIGS. 2-3. The multi-axis robot 2 includes the robot arm 3 that has a robotic arm effector component 4. The multi-axis robot arm 3 may be a configurable mechanical control device for providing robotic movement of the multi-axis robot 2 within the robotic assembly workstation component 1. For a six-axis robot arm 3, six independent computer-controlled motor joints on the robot arm 3 work in unison to software code to enable precise motion control for extension, rotation, pitch, yaw, and the like of the multi-axis robot 2. A universal connector may be mounted as the robotic arm effector component 4 to an end of the robot arm 3 and be configured to automate attachment to varying tools to perform tasks in the robotic assembly workstation component 1. Such tasks may include, but not be limited to, 3D printing, picking up objects, moving objects between locations, assembling objects, and the like.

The frame house further includes a robotic controller 5, one or more printing tool storage units 6, 6', one or more printing tool dispensing systems 7 (FIG. 1) and 21 (FIG. 2), an adjustable print stage 8, and the user interface 9. The adjustable print stage 8 may be a print and/or assembly stage area that is adjustable. In an embodiment, the adjustable print stage 8 may be 12 inches in length by 10 inches in depth. The adjustable print stage 8 is configured to provide an area in the robotic assembly workstation component 1 in which printing and/or assembling of a construct 32 is performed including 3D printing and assembly operations as described herein. The robot arm 3, in combination with varying tools and a software workflow control as provided by the workflow configuration module 24 as described herein, performs such manufacturing tasks to create the construct 32. Thus, the robot arm 3 is configured to enable increased 3D printing capability. In addition to additive manufacture, such as 3D printing on a coordinate plane, the robot arm may aid with contour manufacturing, such as 3D printing on an existing geometric shape or in a coordinate space.

The robotic arm effector component 4 may be configured to interchangeably retrieve or deposit one of one or more printing tool dispensing systems 7, 21, in the printing tool storage unit 6, 6'. The robotic assembly workstation component 1 may include a right-side interchangeable printing tool storage unit 6 and a left-side interchangeable printing tool storage unit 6'. These printing tool storage units 6, 6' may include a configurable number of storage bays with universal connectors for tools to be queued and positioned for precise pickup by the robot arm 3. The printing tool storage units 6, 6' may include electric and data connectivity configured to provide software control of tool functions including, but not limited to, temperature control, data collection, and the like, while the printing tool stage units 6, 6' await use by the robot arm 3. The printing tool storage units 6, 6' may include raw material for the assembly process for a construct 32 such as the determined 3D print material, sub-assembly components, and the like. Further, the printing tool storage units 6, 6' may be configured for temperature control such that temperature control may be maintained with respect to a printing tool at the printing tool storage units 6, 6'.

In an embodiment, as shown in FIG. 2, the one or more printing tool dispensing systems 7, 21 may include multiple syringes 11, each including a material 12, that may be a non-bio material or a bio-material, which material 12 is a 3D printable material. The syringe 11 may be configured to dispense the material 12. The one or more printing tool dispensing systems 7, 21 may further include a syringe barrel 13, a syringe barrel holder 14, and a needle 16. The frame housing of the robotic assembly workstation component 1 may include a tip detection station 31 to detect a tool tip, such as a needle tip, and record the positional coordinates for use with the print and/or assembly instructions of the workflow configuration module 24. In an embodiment, the tip detection station 31 may be configured to automatically determine a lowest most coordinate of any given tool. Knowledge of 3D coordinates of a tool as detected and verified at the tip detection station 31 assists to ensure the robot arm 3 is able to precisely move and perform functions within the robotic assembly workstation component 1 such as 3D printing, picking up objects, moving objects, assembling components, and the like. The robot arm 3 may interact with the tip detection station 31 through mechanically moving a connected tool through use of a camera vision system in which software instructions are used to locate and calculate bottom coordinates of the connected too in the robotic assembly workstation component 1. The one or more printing tool storage units 6, 6' may further include a tool detection sensor to detect a tool size and tip deflection, such as for when the tool is deposited at or retrieved from a printing tool storage units 6, 6'.

The frame housing may include an environmental control device 33 configured to control environmental parameters of the robotic assembly workstation component 1 enclosure. The environmental control device 33 may be configured to provide high efficiency particulate air (HEPA) filtration for an interior of the frame housing to trap over 99% of dust and dirt particles that may be as small as 0.3 microns. The environmental control device 33 may include a door configured for access from within the frame enclosure to allow for periodical changing of disposable heap filters.

The user interface 9 may extend from an external surface of the frame housing. The user interface 9 is a component that is configured to provide for a touchscreen monitor for a user to interface with, as described herein, and to aid with performance of select functions with the associated robotic assembly workstation component 1.

Figure 4A:
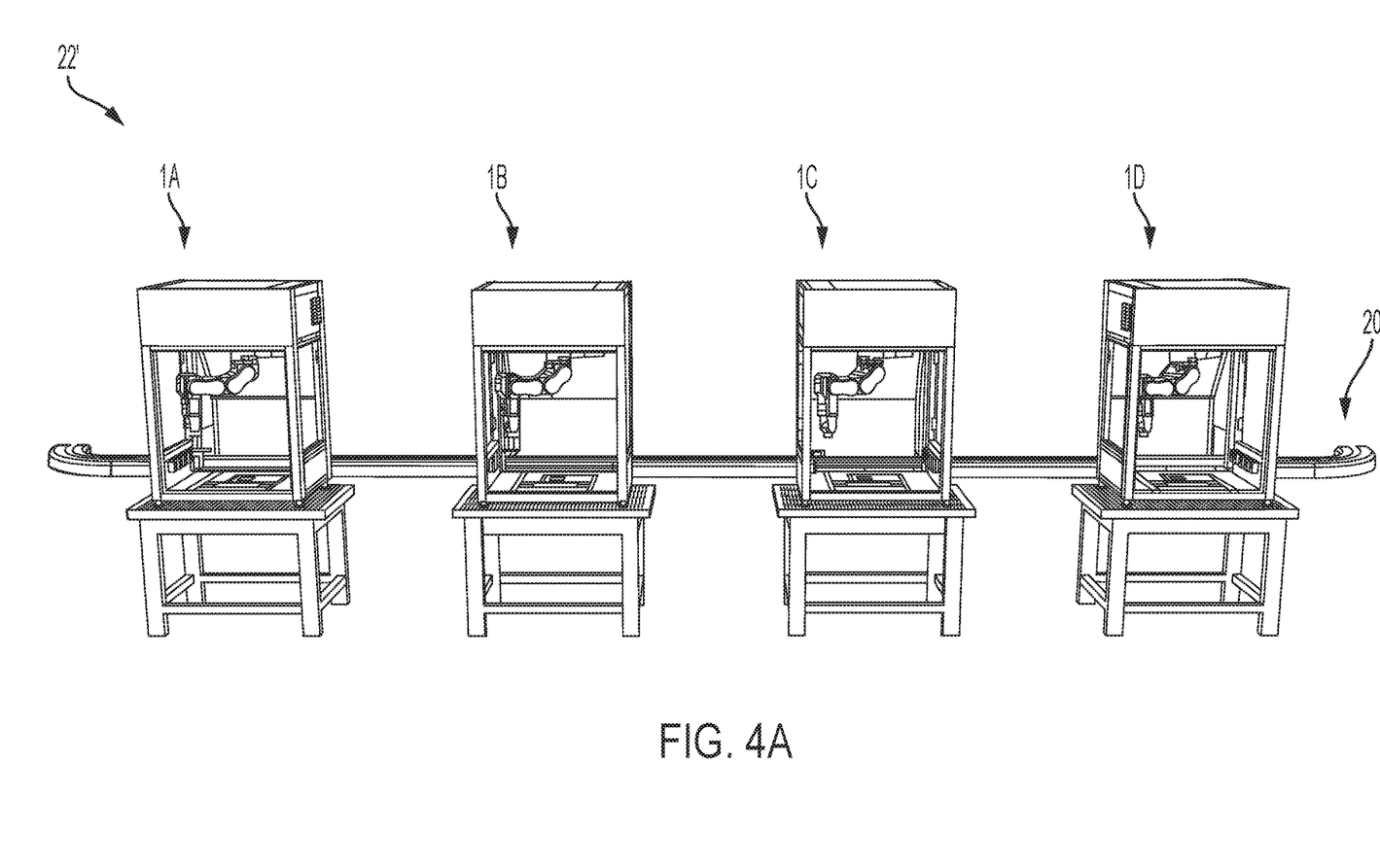
FIG. 4A illustrates a front perspective view of a 3-D design, fabrication and assembly system including a transport conveyor connecting a series of robotic assembly workstation components, according to one or more embodiments shown and described herein.
Figure 4B:
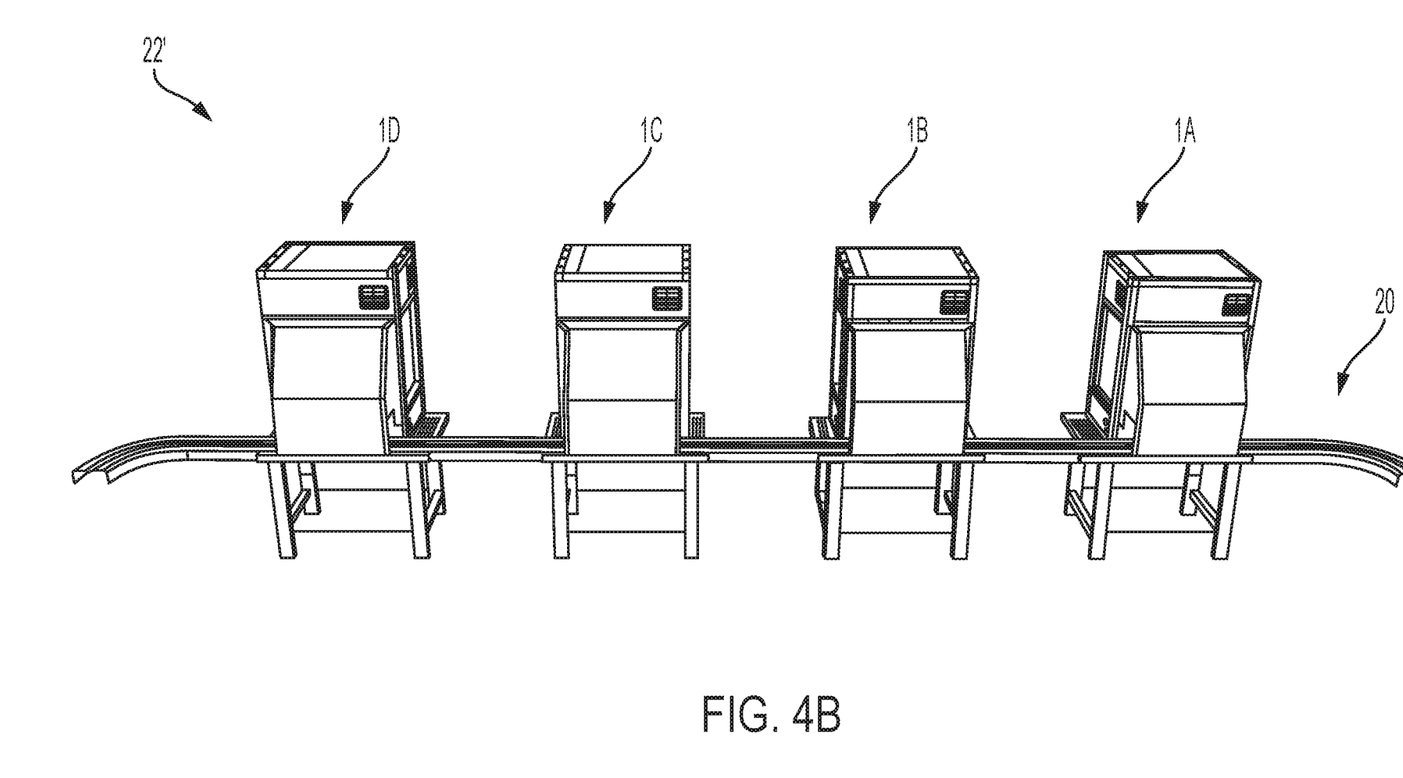
FIG. 4B illustrates a rear perspective view of the 3-D design, fabrication and assembly system of FIG. 4A.
Figure 4C:
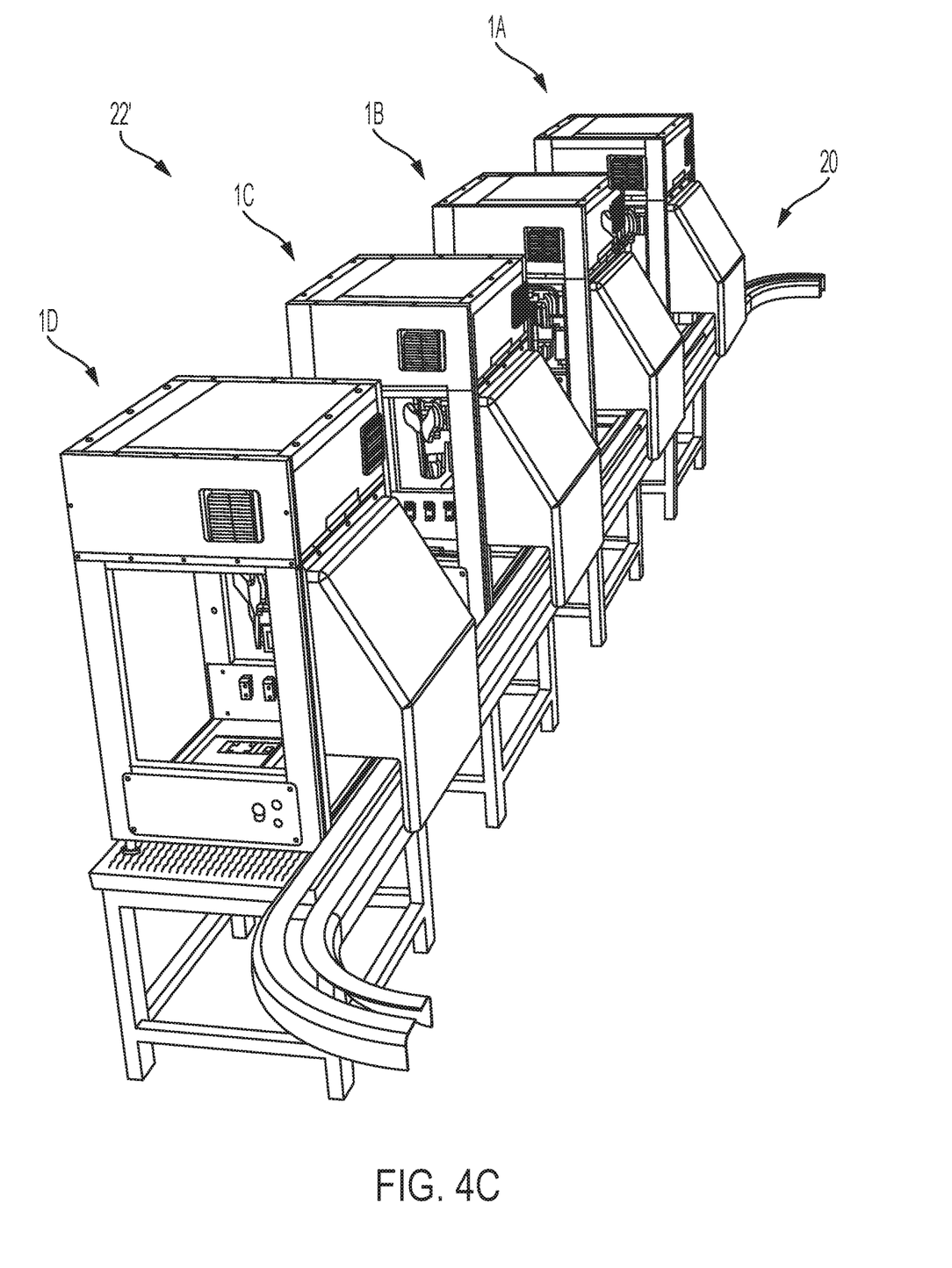
FIG. 4C illustrates a rear side perspective view of the 3-D design, fabrication and assembly system of FIG. 4A.

In an embodiment, the robotic assembly workstation component 1 may include the adjustable print stage 8 disposed near a front portion of the frame enclosure and a transport conveyor 20. The transport conveyor 20 may be disposed at a rear portion, extend from a pair of side portions, and be configured to connect a series of robotic assembly work station components 1A-1D as depicted in FIGS. 4A-4C. The transport conveyor 20 may be a mechanical conveyor device that is a configurable and integrated conveyor configured to move material in and out of the robotic assembly workstation component 1. Movement of the transport conveyor 20 is controllable by the system 22 and associated software to position one or more objects, carriers, assemblies, and the like for retrieval by the robotic arm 3 of the robotic assembly workstation component 1.

The transport conveyor 20 may include an assembly queue station 15 at the rear portion atop the transport conveyor 20. The assembly queue station 15 may be disposed adjacent to and behind the adjustable print stage 8. The assembly queue station 15 is configured to be an area of the robotic assembly workstation component 1 reserved for work in process staging. The robot arm 3, in combination with an appropriate tool, is configured to move material in and out of the area including the assembly queue station 15. A queue area of the assembly queue station 15 may be used to accommodate multiple job processing, enhance assembly cycle time, providing curing time, provide staging for access to the transport conveyor 20, and the like. The assembly queue station 15 may accommodate configurable fixtures to hold assemblies used in the manufacturing and assembly processes for a construct 32 as described herein.

In block 110, the construct 30 is 3-D printed and/or assembled with the multi-axis robot 2 in accordance with the print and/or assembly command based on the automated robot control scheme. In embodiments, and referring to a process 200 of FIG. 6, the one or more instructions, when executed by the hardware processor, further cause the hardware processor to follow the scheme of blocks 202-206. In block 202, one or more assembly orders are received in a production queue. The one or more assembly orders respectively include the series of assembly order instructions for a plurality of respective workflow configuration models of the series of robotic assembly workstation components 1A-1D.

Figure 6:
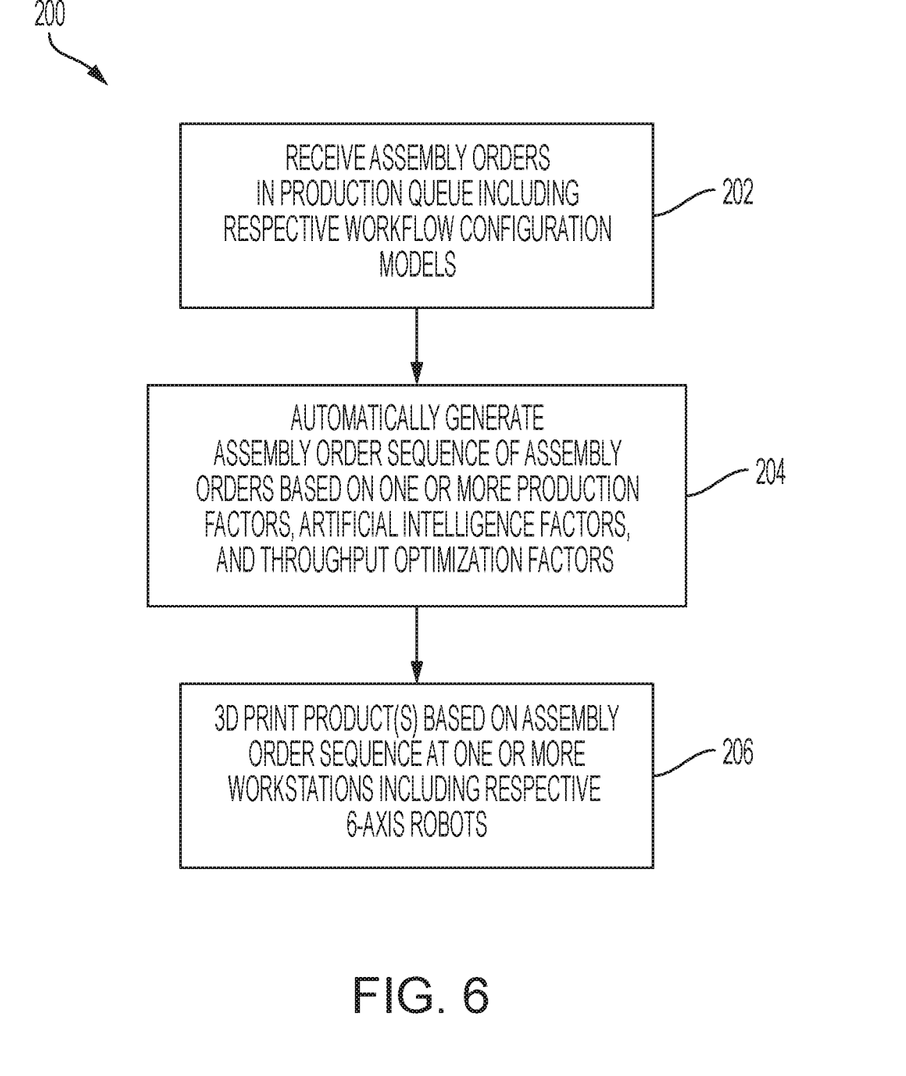
FIG. 6 illustrates a flow chart of another process for generating an assembly order sequence and using and operating the 3-D design, fabrication and assembly system of FIG. 1 or FIG. 4A, according to one or more embodiments shown and described herein.

In embodiments for either of the processes 100, 200, the process may include adding at least one object to an object modeling environment (e.g., the modeling component 23) at the user interface 9. The adding may include selecting, creating, importing or a combination thereof. Each added object may be associated with an object list comprising material parameters as stored in the material database 27. The process may further include performing one or more operations on the one or more objects in the modeling environment to render a desired volumetric model as the rendered volumetric model 30.

In block 204, an assembly order sequence is automatically generated for the one or more assembly orders based on one or more production factors, one or more artificial intelligence factors, and one or more throughout optimization factors. The workflow configuration module 24 may be configured to use a neural network that, in a field of machine learning, for example, may a class of deep, feed-forward artificial neural networks for artificial intelligence applications. The artificial intelligence applications may be configured to learn through one or more sensors of the robotic assembly workstation component(s) 1 to perform and optimize tasks such as quality control tasks, iterative design enhancements, workflow optimization, and the like. The sensors may include vision sensors, temperature sensors, pressure sensors, and the like associated with each robotic assembly workstation component 1. The robot arm 3 may be sized and integrated into a respective robotic assembly workstation component 1 to perform various tasks as well, such as 3D print and/or assembly tasks, based on factors such as size, weight, environmental parameters, and the like. In an embodiment, the assembly order sequence is automatically generated for the one or more assembly orders based on an order of priority based on a ranking of one or more production factors, one or more artificial intelligence factors, one or more throughout optimization factors, or combinations thereof. In embodiments, the ranking is based on an order of priority assigned to the one or more production factors, the one or more artificial intelligence factors, the one or more throughout optimization factors, or combinations thereof. The assembly order sequence may be displayed on the user interface 9.

The system 22 may be configured to apply artificial intelligence to the workflow configuration module 24 to utilize the one or more artificial intelligence factors and/or machine learning to create, modify, and/or optimize the assembly order sequence based on the volumetric model 30. As a non-limiting example, the system may track efficiencies and other data associated with previous assembly orders for a construct 32 to modify and optimize the assembly order sequence for a subsequent construct 32 of the same type. The one or more throughput optimization factors may be utilized with the system 22, or the system 22', for example, to determine an assembly order sequence based on a maximum throughput, available material and inventory parameters, production capacity parameters, and other determined optimization factors. In block 206, one or more constructs 32 are printed and/or assembled with the multi-axis robot 2, such as a six-axis robot 2, in accordance with the assembly order sequence.

Referring to again to the system 22 of FIG. 1, the non-transitory system 22 for implementing a computer and software-based method, such as processes 100, 200 of FIGS. 4-5, is illustrated as being implemented along with using the user interface 9 and that may be communicatively coupled to another user workstation, such as a computer, for example. The system 22 comprises a communication path for communicatively coupling the modeling component 23, the workflow configuration module 24, the one or more hardware processors 25, a non-transitory memory 26, the material database 27, network interface hardware, a network 28, a server, and the user interface 9 of the robot assembly workstation component 1. The various components of the system 22 and the interaction thereof will be described in detail below and are also used with similar operation for the system 22'.

The system 22 can comprise multiple application servers and workstations. In some embodiments, the system 22 is implemented using a wide area network (WAN) or network 322, such as an intranet or the Internet. The robotic assembly workstation component 1 may include digital systems and other devices permitting connection to and navigation of the system 22. The lines depicted in FIG. 1 indicate communication rather than physical connections between the various components.

The system 22 comprises a communication path that may be formed from any medium that is capable of transmitting a signal such as, for example, conductive wires, conductive traces, optical waveguides, or the like, or from a combination of mediums capable of transmitting signals. The communication path communicatively couples the various components of the system 22. As used herein, the term "communicatively coupled" means that coupled components are capable of exchanging data signals with one another such as, for example, electrical signals via conductive medium, electromagnetic signals via air, optical signals via optical waveguides, and the like.

The system 22 of FIG. 1 also comprises the hardware processor 25, which can be any device capable of executing machine-readable instructions. Accordingly, the hardware processor 25 may be a controller, an integrated circuit, a microchip, a computer, or any other computing device. The hardware processor 25 is communicatively coupled to the other components of the system 22 by the communication path. Accordingly, the communication path may communicatively couple any number of processors with one another, and allow the modules coupled to the communication path to operate in a distributed computing environment. Specifically, each of the modules can operate as a node that may send and/or receive data.

The illustrated system 22 further comprises the memory 26 which is coupled to the communication path and communicatively coupled to the hardware processor 25. The memory 26 may be a non-transitory computer readable medium or non-transitory computer readable memory and may be configured as a nonvolatile computer readable medium. The memory 26 may comprise RAM, ROM, flash memories, hard drives, or any device capable of storing machine-readable instructions such that the machine-readable instructions can be accessed and executed by the hardware processor 25. The machine-readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine-readable instructions and stored on the memory component 306. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, as noted above, the system 22 comprises a display such as the user interface 9 for providing visual output such as, for example, information, a volumetric model 30 of a construct 32, graphical reports, messages, or a combination thereof. The display on the user interface 9 is coupled to the communication path and communicatively coupled to the hardware processor 25. Accordingly, the communication path communicatively couples the display to other modules of the system 22. The display can comprise any medium capable of transmitting an optical output such as, for example, a cathode ray tube, light emitting diodes, a liquid crystal display, a plasma display, or the like. Additionally, it is noted that the display or the robotic assembly workstation component 1 can comprise at least one of the hardware processor 25 and the memory 26. While the system 22 is illustrated as a single, integrated system in FIG. 1, in other embodiments, the systems can be independent systems. As will be described in further detail below, the hardware processor 25 may process the input signals received from the system modules and/or extract information from such signals.

The system 22 comprises the network interface hardware for communicatively coupling the system 22 with a computer network such as network 28. The network interface hardware is coupled to the communication path such that the communication path communicatively couples the network interface hardware to other modules of the system. The network interface hardware can be any device capable of transmitting and/or receiving data via a wireless network. Accordingly, the network interface hardware can comprise a communication transceiver for sending and/or receiving data according to any wireless communication standard. For example, the network interface hardware can comprise a chipset (e.g., antenna, processors, machine-readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 1, data from various applications running on a computer associated with the robotic assembly workstation component 1 can be provided from the computer to the system 22 via the network interface hardware. The computer can be any device having hardware (e.g., chipsets, processors, memory, etc.) for communicatively coupling with the network interface hardware and a network 28. Specifically, the computer can comprise an input device having an antenna for communicating over one or more of the wireless computer networks described above.

The network 28 can comprise any wired and/or wireless network such as, for example, wide area networks, metropolitan area networks, the Internet, an Intranet, satellite networks, or the like. Accordingly, the network 28 can be utilized as a wireless access point by the computer 324 to access one or more servers that generally comprise processors, memory, and chipset for delivering resources via the network 28. Resources can include providing, for example, processing, storage, software, and information from the server to the system 22 via the network 28. Additionally, the server(s) can share resources with one another over the network 28 such as, for example, via the wired portion of the network, the wireless portion of the network, or combinations thereof.

Data stored and manipulated in the system 22 as described herein is utilized by the workflow configuration module 24, which is able to leverage the network 28, such as a cloud computing-based network configuration (e.g., the cloud) or other network 28 variations, to apply machine learning and artificial intelligence. This machine learning application may create models that can be applied by the system 22, to make it more efficient and intelligent in execution. As an example, and not a limitation, the artificial intelligence feature may include components selected from the group consisting of an artificial intelligence engine, Bayesian inference engine, and a decision-making engine, and may have an adaptive learning engine further comprising a deep neural network learning engine.

In embodiments describe herein, the workflow configuration module 24 for a robotic assembly workflow component 1 is configured to provide for configurable, customizable, and optimized workflow sequences to print and/or assembly an assembly or sub-assemblies such that a large number of customizable tasks may be accommodated within a single, agile robotic assembly workflow component 1. Further, use of the robotic assembly workflow component 1 to automatically generate such an optimized workflow sequence customizable to a task and included an automated robot control scheme as described herein reduces or eliminates a need for expert technicians to program robot movements, such as typical for a finite number of highly repetitive tasks in industry. Further, users may visually build and connect 3d print and/or assembly workflow sequences through use of the workflow configuration module 24 and associated user interface 9 without requiring robotic software programming by the user.

In additional embodiments, use of a universal connector with the robot arm aids to provide a large number of possible design tool options and tool usages to build various objects. Such flexible design tool options for 3D print, assemble, measurement, pick and place, and like tasks are able to provide users with a speedy, faster to mark, agile manufacturing solution. Further, integration of the one or more robotic assembly workflow components 1 as described herein with other manufacturing process equipment provides for additional flexibility for assembly operations. The workflow configuration module 24 as describe herein further provides for one or more visual drag and drop workflow through the user interface 9 to allow for a variety of manufacturing tasks such as 3D print, quality control, assembly, and the like, allowing for an extension to many integrated workstation components to enhance flexibility, capacity, and throughput.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for designing a volumetric model of a construct at a user interface through use of a 3-D design, fabrication and assembly system comprising a workflow configuration module, the method comprising:

transmitting a rendered volumetric model of the construct to the workflow configuration module;

generating, through the workflow configuration module, a 3-D print bill of materials for the rendered volumetric model;

generating a workflow configuration model for the rendered volumetric model based on the 3-D print bill of materials, wherein the workflow configuration model comprises an automated robot control scheme comprising a series of assembly order instructions to direct a robotic assembly workstation component to print and/or assemble the construct in accordance with the automated robot control scheme;

transmitting the workflow configuration model comprising the automated robot control scheme to the robotic assembly workstation component with a print and/or assembly command in accordance with the automated robot control scheme; and printing and/or assembling the construct in accordance with the print and/or assembly command.

2. The method of claim 1, wherein the series of assembly order instructions are configured to direct a robot arm of a multi-axis robot to sequentially follow an assembly order, the assembly order comprising one or more robot arm motion path instructions, one or more tool usage instructions, one or more material movement instructions, or combinations thereof.

3. The method of claim 1, wherein:
the robotic assembly workstation component comprises a frame housing comprising:
a multi-axis robot comprising a robot arm having a robotic arm effector component,
a robotic controller,
a printing tool storage unit,
one or more printing tool dispensing systems,
an adjustable print stage, and
the user interface.

4. The method of claim 3, wherein the robotic arm effector component is configured to interchangeably retrieve or deposit one of the one or more printing tool dispensing systems in the printing tool storage unit.

5. The method of claim 1, wherein:
a multi-axis robot of the robotic assembly workstation component comprises a six-axis robot; and
the robotic assembly workstation component comprises
an adjustable print stage disposed near a front portion, and
a transport conveyor disposed at a rear portion, extending from a pair of side portions, and configured to connect a series of robotic assembly workstation components.

6. The method of claim 5, wherein the transport conveyor comprises an assembly queue station at the rear portion atop the transport conveyor, the assembly queue station disposed adjacent to and behind the adjustable print stage.

7. The method of claim 5, further comprising:
receiving one or more assembly orders in a production queue, the one or more assembly orders respectively comprising the series of assembly order instructions for a plurality of respective workflow configuration models of the series of robotic assembly workstation components;
automatically generating an assembly order sequence for the one or more assembly orders in the production queue based on one or more production factors, one or more artificial intelligence factors, and one or more throughout optimization factors; and
printing and/or assembling one or more constructs with one or more respective six-axis robots of the respective robotic assembly workstation components in accordance with the assembly order sequence.

8. The method of claim 7, further comprising:
automatically generating the assembly order sequence for the one or more assembly orders based on an order of priority based on a ranking of one or more production factors, one or more artificial intelligence factors, one or more throughout optimization factors, or combinations thereof; and
displaying the assembly order sequence on the user interface.

9. The method of claim 8, wherein the assembly order sequence is modifiable by the user, automatically based on receipt of additional factors, or combinations thereof.

10. The method of claim 1, further comprising:
adding at least one object to an object modeling environment at the user interface, wherein adding comprising selecting, creating, importing or a combination thereof, and further wherein each added object is associated with an object list comprising material parameters; and
performing one or more operations on the one or more objects in the modeling environment to render a desired volumetric model as the rendered volumetric model.

11. A 3-D design, fabrication and assembly system comprising:
a robotic assembly workstation component;
a workflow configuration module; and
a hardware processor coupled to a memory storing one or more instructions; and
wherein the one or more instructions, when executed by the hardware processor, cause the hardware processor to
transmit a rendered volumetric model of the construct to the workflow configuration module,
generate, through the workflow configuration module, a 3-D print bill of materials for the rendered volumetric model,
generate a workflow configuration model for the rendered volumetric model based on the 3-D print bill of materials, wherein the workflow configuration model comprises an automated robot control scheme comprising a series of assembly order instructions to direct the robotic assembly workstation component to print and/or assemble the construct in accordance with the automated robot control scheme,
transmit the workflow configuration model comprising the automated robot control scheme to the robotic assembly workstation component with a print and/or assembly command in accordance with the automated robot control scheme, and
print and/or assemble the construct in accordance with the print and/or assembly command.

12. The 3-D design, fabrication and assembly system of claim 11, wherein the series of assembly order instructions are configured to direct a robot arm of a multi-axis robot to sequentially follow an assembly order, the assembly order comprising one or more robot arm motion path instructions, one or more tool usage instructions, one or more material movement instructions, or combinations thereof.

13. The 3-D design, fabrication and assembly system of claim 11, wherein:
the robotic assembly workstation component comprises a frame housing comprising:
a multi-axis robot comprising a robot arm having a robotic arm effector component,
a robotic controller,
a printing tool storage unit,
one or more printing tool dispensing systems,
an adjustable print stage, and
a user interface.

14. The 3-D design, fabrication and assembly system of claim 11, wherein:

a multi-axis robot of the robotic assembly workstation component comprises a six-axis robot; and the robotic assembly workstation component comprises
- an adjustable print stage disposed near a front portion, and
- a transport conveyor disposed at a rear portion, extending from a pair of side portions, and configured to connect a series of robotic assembly workstation components.

15. The 3-D design, fabrication and assembly system of claim 14, wherein the one or more instructions, when executed by the hardware processor, further cause the hardware processor to:
- receive one or more assembly orders in a production queue, the one or more assembly orders respectively comprising the series of assembly order instructions for a plurality of respective workflow configuration models of the series of robotic assembly workstation components;
- automatically generate an assembly order sequence for the one or more assembly orders based on one or more production factors, one or more artificial intelligence factors, and one or more throughout optimization factors; and
- print and/or assemble one or more constructs with the six-axis robot in accordance with the assembly order sequence.

16. The 3-D design, fabrication and assembly system of claim 15, wherein the one or more instructions, when executed by the hardware processor, further cause the hardware processor to:
- automatically generate the assembly order sequence for the one or more assembly orders based on an order of priority based on a ranking of one or more production factors, one or more artificial intelligence factors, one or more throughout optimization factors, or combinations thereof; and
- display the assembly order sequence on a user interface.

17. A method for designing a volumetric model of a construct at a user interface through use of a 3-D design, fabrication and assembly system comprising a robotic assembly workstation component, the method comprising:
- receiving one or more assembly orders in a production queue, the one or more assembly orders respectively comprising a plurality of assembly order instructions for a plurality of respective workflow configuration models generated by a workflow configuration module for a series of robotic assembly workstation components, the plurality of respective workflow configuration models generated based on the 3-D print bill of materials, wherein each workflow configuration model comprises an automated robot control scheme comprising a series of assembly order instructions to direct a robotic assembly workstation component to print and/or assemble the construct in accordance with the automated robot control scheme;
- automatically generating an assembly order sequence for the one or more assembly orders in the production queue based on a ranking of one or more production factors, one or more artificial intelligence factors, one or more throughout optimization factors, or combinations thereof;
- displaying the assembly order sequence on a user interface; and
- printing and/or assembling one or more constructs with the respective robotic assembly workstation components in accordance with the assembly order sequence.

18. The method of claim 17, wherein the ranking is based on an order of priority assigned to the one or more production factors, the one or more artificial intelligence factors, the one or more throughout optimization factors, or combinations thereof.

19. The method of claim 17, wherein the assembly order sequence is modifiable by the user, automatically based on receipt of additional factors, or combinations thereof.

20. The method of claim 17, wherein each robotic assembly workstation component comprises
- an adjustable print stage disposed near a front portion, and
- a transport conveyor disposed at a rear portion, extending from a pair of side portions, and configured to connect the series of robotic assembly workstation components.

* * * * *